United States Patent
McElvaney

(10) Patent No.: US 6,859,525 B1
(45) Date of Patent: Feb. 22, 2005

(54) INTERNET TELEPHONY DEVICE

(75) Inventor: David McElvaney, Monkton, MD (US)

(73) Assignee: Riparius Ventures, LLC, Timonium, MD (US)

(*) Notice: Subject to any disclaimer, the term of this patent is extended or adjusted under 35 U.S.C. 154(b) by 1226 days.

(21) Appl. No.: 08/734,857

(22) Filed: Oct. 23, 1996

(51) Int. Cl.⁷ .............................................. H04M 1/64
(52) U.S. Cl. ........................... 379/88.17; 379/88.07; 379/88.11; 379/88.13; 379/265.09
(58) Field of Search ......................... 379/88.17, 88.18, 379/90.01, 93.01, 93.05, 93.09, 100.15, 100.16; 370/352, 353, 380, 389, 392, 396, 401, 404, 427, 435, 450, 465, 485, 260; 381/83, 92, 94; 709/227, 230, 232

(56) References Cited

U.S. PATENT DOCUMENTS

| | | | |
|---|---|---|---|
| 4,991,197 A | 2/1991 | Morris | 379/58 |
| 5,283,638 A * | 2/1994 | Engberg et al. | 348/14 |
| 5,404,455 A | 4/1995 | Daly et al. | 395/275 |
| 5,408,520 A | 4/1995 | Clark | 379/93 |
| 5,515,423 A | 5/1996 | Beck | 379/93 |
| 5,526,408 A | 6/1996 | Yekutiely | 379/90 |
| 5,553,122 A | 9/1996 | Haber et al. | 379/90 |
| 5,606,599 A | 2/1997 | O'Mahony | 379/93.09 |
| 5,617,423 A | 4/1997 | Li et al. | 370/426 |
| 5,633,920 A * | 5/1997 | Kikinis et al. | 379/130 |
| 5,673,325 A * | 9/1997 | Andrea et al. | 381/92 |
| 5,675,390 A * | 10/1997 | Schindler et al. | 348/552 |
| 5,715,321 A * | 2/1998 | Andrea et al. | 381/92 |
| 5,721,951 A * | 2/1998 | DorEl | 395/830 |
| 5,727,047 A * | 3/1998 | Bentley et al. | 379/93 |
| 5,750,911 A * | 5/1998 | Tamura | 84/602 |
| 5,761,294 A | 6/1998 | Shaffer | 379/230 |
| 5,799,068 A * | 8/1998 | Kikinis et al. | 379/93.06 |
| 5,822,406 A | 10/1998 | Brown | 379/88 |
| 5,835,585 A * | 11/1998 | Morse | 379/424 |
| 5,838,665 A * | 11/1998 | Kahn et al. | 370/260 |
| 6,226,678 B1 * | 5/2001 | Mattaway et al. | 709/230 |

* cited by examiner

Primary Examiner—Allan Hoosain
(74) Attorney, Agent, or Firm—Max Stul Oppenheimer

(57) ABSTRACT

A novel device to facilitate digital network, such as the internet, telephony by connecting a standard telephone handset to a computer sound card so as to allow voice communication using an integrated microphone and speaker is provided in which a specialized cable having a four-wire handset or equivalent telephone jack at one end and a pair of jacks adapted to engage the input and output ports of a computer soundcard at a second end connects a standard telephone handset to a computer soundcard or, in a second embodiment, in which a telephone handset is provided with a cable having a pair of jacks adapted to engage the input and output ports of a computer soundcard.

7 Claims, 2 Drawing Sheets

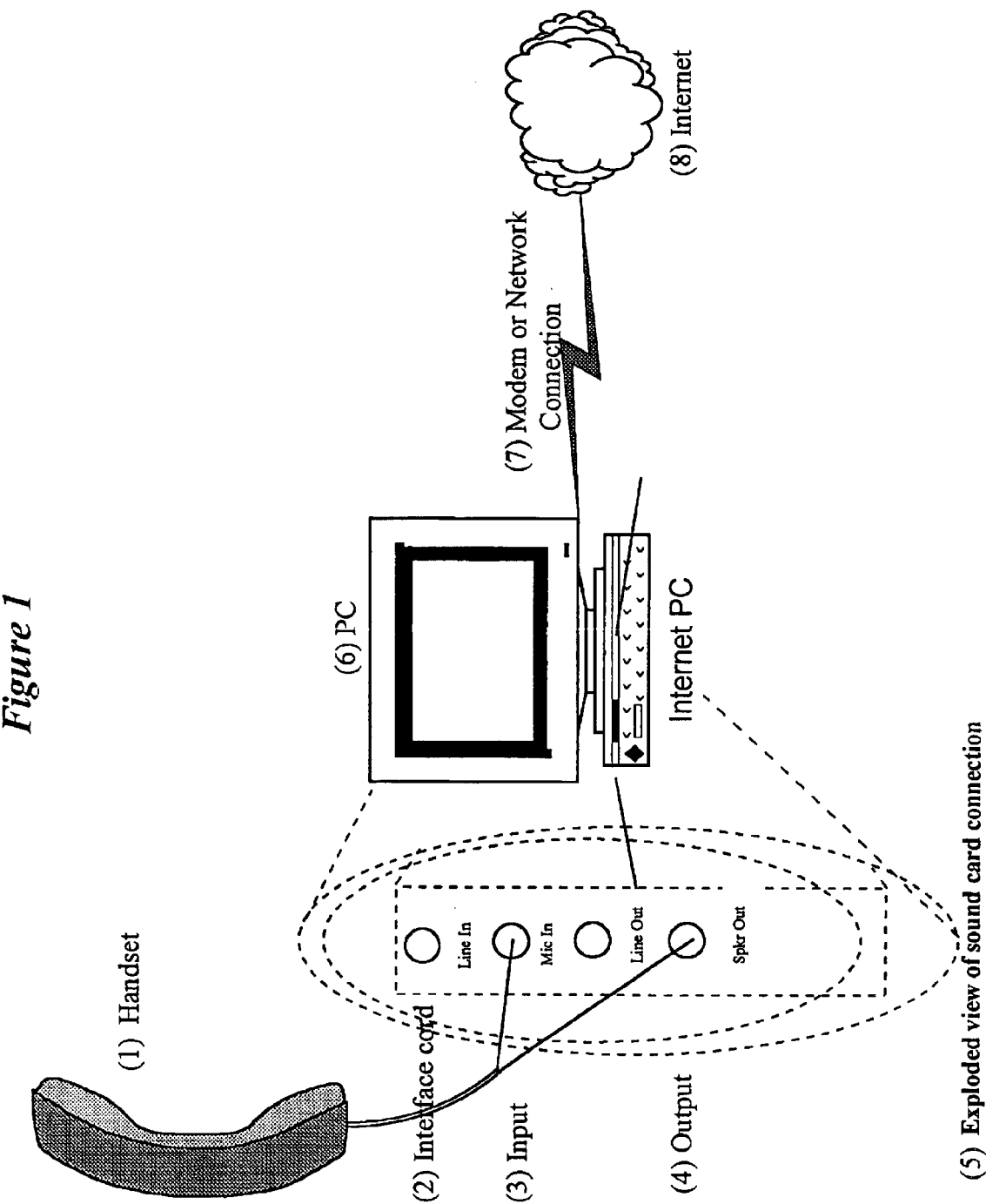

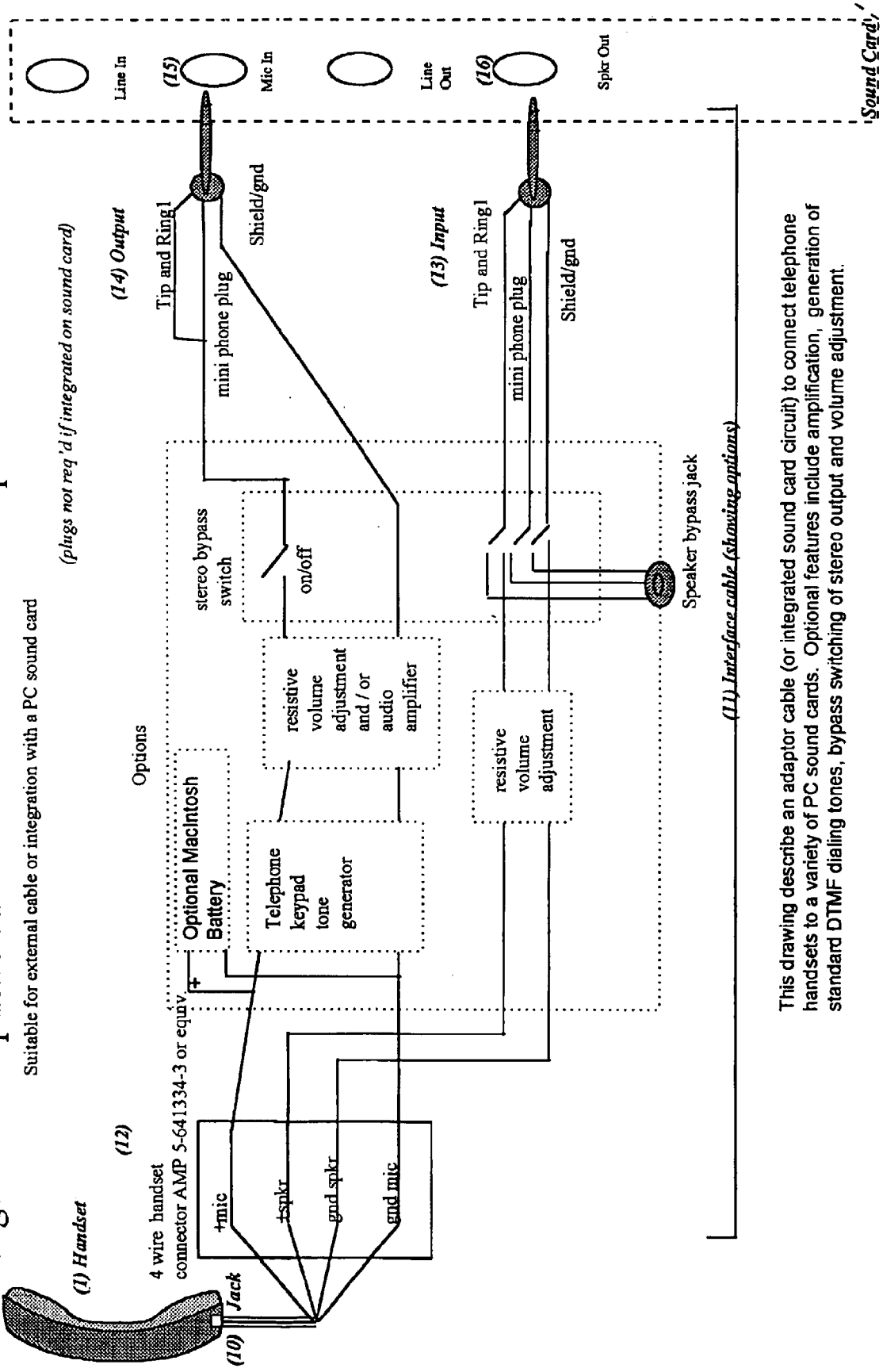
Figure 2: Telephone handset to PC sound card adaptor

INTERNET TELEPHONY DEVICE

FIELD AND BACKGROUND OF THE INVENTION

1. Field of the Invention

The present invention relates to the field of communications, and, more specifically, to a system and device which facilitate the transmission and receipt of voice data between a talker and a listener over the internet or other digital network in an interactive fashion.

2. Background Information

The invention described and claimed herein comprises a novel device to facilitate digital network telephony by connecting a standard telephone handset to a computer sound card so as to allow voice communication using an integrated microphone and speaker.

Recent advances in data compression technology have enabled transmission of voice conversations over digital networks, such as the internet or private digital networks. This is accomplished by providing at least two users with access to the internet and with computer hardware and internet telephony software. The hardware typically comprises a personal computer equipped with a sound card having both a "Line-In" or "Microphone-In" port and a "Line-Out" or "Speaker-Out" port, a microphone connected to the Microphone-In or Line-In port, one or more speakers connected to the Line-Out or Speaker-Out port; a central processing unit capable of converting analogue voice data to digital data and vice-versa; and means for transmitting and receiving data over a telephone line (typically a modem). Suitable internet telephony software includes COOL TALK (™), available from Netscape Communications or INTERNET PHONE VERSION 4.0(™), available from Vocaltec.

Such a system operates as follows. For simplicity, it is assumed that there are two users, a "talker" and a "listener"; in practice, the parties to a conversation change roles, but the process is the same with respect to the then-current talker and the then-current listener; in the case of full-duplex communication, each party may simultaneously be a talker and a listener. A talker's voice is captured by a microphone connected to the sound card interfaced with the local user's computer via the sound card's "Line-In" or "Microphone-In" line. It is then digitized and compressed, using the CPU and internet telephony software. The digitized and compressed data is then transmitted to the internet using a modem, where it is retrieved by the listener's computer, using a second modem. The listener's computer decompresses the data and feeds it to a soundcard having a line-out or speaker-out port connected to a speaker, where it is converted to analog form which may be heard by the listener.

This system offers the ability to use the internet infrastructure to carry voice conversations, with all the attendant advantages over written communications. However, as currently implemented, it suffers from at least four disadvantages.

The first disadvantage is the requirement of a microphone and at least one separate speaker, which require space and may be difficult to place so as to be convenient for use. The microphone in particular must be close enough to the user to receive a sufficient signal strength to survive the various processes and transmissions which are required, yet may interfere with operation of the computer if placed in its most natural location.

The locations of the microphone prevent the consistent and clear capture by the microphone of the local user's voice. The distance the local user's voice must travel from the user's mouth to the microphone diminishes the decibel level at which the user's voice reaches the microphone. This distance not only prevents the microphone from capturing the local user's voice when at low decibels, but allows background noise to enter into the sound stream captured by the microphone. This can result in both "choppy" and "dirty" captures of the user's voice that is transmitted to a remote user. Choppy captures occur when the talker lowers the decibel level of his or her voice below that which the microphone will recognize. This results in the word or words of lowered decibel level not being captured. The incompletely captured sentence is transmitted through the system to the listener's speaker or speakers. Thus, the remote user does not understand the meaning of the local user's communication because of its lack of completeness or "choppiness." Dirty captures occur when the talker is in a setting where background noise is present. When the decibel level of the background noise reaching the microphone approaches or exceeds that of the talker's voice reaching the microphone, the resulting sound captured by the microphone is either of both the talker's voice and the background noise or solely the background noise. The resulting combination of voice and background noise or pure background noise that is then transmitted to the listener and rendered difficult or impossible to comprehend. In half duplex mode, background noise alone can "lock" the conversation into send-only mode where the user remote from the source of background noise cannot respond.

A related, but more serious disadvantage of a separate microphone and speaker is acoustic echo or feedback, generated when a microphone picks up the sound from a speaker and retransmits it to the talker, whose own microphone may pick it up and retransmit it to the listener and so forth.

Finally, separate speaker and microphone configurations make privacy of communications difficult and admit background noise, while also creating an unacceptably high level of background noise when used in a business environment.

Prior solutions to these problems have tended to work against each other. To prevent or reduce the poor capture of a talker's communication, the microphone's sensitivity has been increased. However, this increased sensitivity also increases the amount of background noise captured by the microphone and increases feedback problems. Similarly, to prevent or reduce the reception of background noise captured by the microphone, the microphone's sensitivity is decreased. However, this decreased sensitivity also decreases the quality and quantity of captured low decibel communications, resulting in "choppy" communications.

SUMMARY OF THE INVENTION

It is therefore an object of the invention to provide a system which facilitates digital network telephony without the need for separate microphone and speaker.

It is a further object of the invention to provide a system which does not generate feedback, and provides superior recording performance.

A principal feature of the invention is a connection between a standard telephone handset and the sound card of a computer so as to allow voice communication using the integrated microphone and speaker of the handset.

Among the advantages of the invention are the reduction or elimination of feedback and the elimination of the need for separately purchased and separately located microphone and speaker, as well as improved recording capability for voice enabled application software.

These and other objects, features and advantages which will be apparent from the discussion which follows are achieved, in accordance with the invention, by providing a novel device to facilitate internet telephony by connecting a standard telephone handset to a computer sound card so as to allow voice communication using an integrated microphone and speaker.

For a better understanding of the invention, its advantages and objects, reference is made to the accompanying drawings and descriptive matter in which a preferred embodiment of the invention is illustrated.

BRIEF DESCRIPTION OF THE DRAWINGS

The invention is illustrated by way of example and not limited to the figures of the accompanying drawings, in which like references indicate similar elements and in which:

FIG. 1 is an overview of a system utilizing the novel device.

FIG. 2 is a detailed schematic of the preferred embodiment, also showing the optional features of a battery, a telephone keypad tone generator, a resistive volume adjustment or audio amplifier, a stereo bypass switch and a speaker bypass jack.

DESCRIPTION OF THE PREFERRED EMBODIMENT

Referring to the drawings, the invention is a novel device to facilitate internet telephony by connecting a standard telephone handset to a computer sound card so as to allow voice communication using an integrated microphone and speaker shown in overview in FIG. 1.

For simplicity, only one setup is shown. In practice, each participant would have a similar setup.

A communication system is constructed, having:

telephone handset (1), connected by interface cord (2) to the input (3) and output (4) ports of soundcard (5), said soundcard being engaged to personal computer (6) and said personal computer (6) having a modem or other connection (7) to the a digital network, here the internet (8), said computer (6) running communications software, a suitable example being NETSCAPE (™), and running, a suitable example being COOLTALK(™), both available from Netscape Communications.

Referring to FIG. 2, the interface is shown in detail. Telephone handset (1) has a jack (10), typically adapted to receive a plug commonly referred to as a four-wire handset plug (or RJ14 plug). Interface cable (11) comprises four wires terminating in a four-wire handset plug (12) at a first end, and in plugs adapted to fit input and output ports of soundcard (5) at a second end. In the first preferred embodiment, said second end comprises two wires connected to each of input plug (13) and output plug (14). The wiring diagram is described below with reference to FIG. 3.

The sound card has at least one input port (15), commonly referred to as a "Line-In" or "Microphone-In" jack; and at least one output port (16), commonly referred to as a "Line-Out" or "Speaker-Out" jack.

When the output plug (14) is insert ed into input port (15) and the input plug (13) is inserted into the output port (16)

a full-duplex-capable connection between the handset and sound card is achieved.

The following experiments were conducted to confirm the operation and advantages of the invention.

First a conventional internet telephony link was established as follows. A ZEOS PANTERA(™) brand pentium 133 desktop PC using a CREATIVE LABS SOUND-BLASTER 16(™) soundcard was connected to ALTEC LANSING AC55(™) speakers and a QUICKSHOT(™) electret microphone. The PC was loaded with INTERNET PHONE VERSION 4.0(™) internet telephony software, running in half-duplex speakerphone mode, and an internet connection was established across an ETHERNET(™) LAN using a dedicated ISDN router. Using this configuration of hardware and software, a link was established with another, remote user. As expected, the voice quality was variable and suffered from dropped data and feedback. In addition, there was a time delay on the order of ½ second between one user's completion of a sentence and the other user's receipt of the sound.

Next, an internet telephony link was established using a prototype of the invention. The prototype was constructed as follows. A ZEOS PANTERA(™) brand pentium 133 desktop PC using a CREATIVE LABS SOUNDBLASTER 16(™) soundcard was connected to a specially constructed device created by attaching a custom-built cable (illustrated in FIG. 2), having a four-wire handset plug at one end and two mini-phone plugs at the other end, further having two pairs of two wires, one pair being connected from the earpiece pins of the four-wire handset plug to a speaker-out jack of the soundcard, and the second pair being connected from the microphone pins of the four-wire handset plug to a microphone-in jack of the soundcard, to the four-wire handset jack in the handset of a CONAIR $SW_{220}$(™) modular telephone and to the microphone-in and speaker-out jacks of the soundcard, respectively. The PC was loaded with INTERNET PHONE VERSION 4.0(™) internet telephony software, running in half-duplex speakerphone mode, and an internet connection was established across an ETHERNET(™) LAN using a dedicated ISDN router. Again, a link was established with another, remote user.

This time, the voice quality was dramatically improved and approached normal telephone quality. There was no noticeable dropped data and no noticeable feedback. In addition, the time delay between one user's completion of a sentence and the other user's receipt of the sound dropped to less than ¼ second, due to the improved switchover time resulting from lowered background noise.

In order to adapt the above system for use with a MACINTOSH(™) computer, it is necessary to add an external power supply since the typical MACINTOSH(™) soundcard does not provide external power. This addition is within the skill of those of ordinary skill in the art, and simply requires adding a battery-powered or line-powered power supply to the microphone.

Thus, there has been described a novel device to facilitate digital network, such as internet, telephony by connecting a standard telephone handset to a computer sound card so as to allow voice communication using an integrated microphone and speaker that has a number of novel features, and a manner of making and using the invention.

While a specific embodiment of the invention has been shown and described in detail to illustrate the application of the principles of the invention, it will be understood that the invention may be embodied otherwise without departing from such principles and that various modifications, alternate constructions, and equivalents will occur to those skilled in the art given the benefit of this disclosure.

For example, a soundcard could be constructed with a four-wire handset jack instead of the standard mini-phone jacks, thereby allowing connection of a standard telephone handset with commercially available telephone handset cords. Alternatively, a telephone handset could be constructed with a hardwired cord terminating in suitable mini-phone plugs, thereby allowing direct connection to a conventional soundcard.

Furthermore, it would be obvious to one skilled in the art how to connect a resistive volume control so as to allow a user to adjust the volume to taste, or to incorporate a standard keytone generator in the handset to allow not only voice but tone generation, thereby enabling the use of touchtone activated devices (for example, voicemail access).

It would also be advantageous to equip the above-described handset with a switch, preferably a pressure-sensitive switch, that would detect when the handset was out of use (for example, resting on a telephone cradle or on a desk) and when the handset was in use. Such a switch could be connected to an automatic bypass switch to deactivate any external speakers and activate the handset microphone and speaker when the handset is in use.

Thus, the invention is not limited to the specific embodiment described herein, but is defined by the appended claims.

What is claimed is:

1. A digital network telephony device comprising:
    a telephone handset comprising a microphone and a speaker, said microphone being connected to at least two microphone wires and said speaker being connected to at least two speaker wires;
    a computer system comprising a computer sound card having an input jack and an output lack and means for receiving and transmitting digital audio signals, means for compressing and decompressing said audio signals, means for transmitting compressed audio signals to a digital network, means for receiving compressed audio signals from said digital network; and
    connecting means for connecting the microphone wires to the input jack and for connecting the speaker wires to the output jack, said connecting means further selectively providing power to said microphone and said speaker, either from said computer sound card or from a source external to said computer sound card.

2. A device as in claim 1 wherein said means for connecting the microphone wires to the input jack and for connecting the speaker wires to the output jack comprises a cable having a four-wire handset jack at first end thereof and two mini-phone plugs at a second end thereof, one of said mini-phone plugs being designated a microphone plug and being connected to the microphone wires and the second of said mini-phone plugs being designated a speaker plug and being connected to the speaker wires.

3. A device as in claim 1, further comprising a resistive volume control for controlling the loudness of the speaker.

4. A device as in claim 1, further comprising a keytone generator operatively connected to the microphone wires.

5. A device as in claim 1, further comprising an external power supply for powering said microphone.

6. A device as in claim 1, further comprising an automatic bypass switch to deactivate any external speakers and activate the handset microphone and speaker when the handset is in use.

7. A device for connecting
    a telephone handset comprising a microphone and a speaker, said microphone being connected to at least two microphone wires and said speaker being connected to at least two speaker wires; with
    a computer system comprising a computer sound card having an input jack and an output jack and means for receiving and transmitting audio signals, means for compressing and decompressing said audio signals, means for transmitting compressed audio signals to a digital network, means for receiving compressed audio signals from the digital network;
    said device comprising a cable comprising two microphone wires and two speaker wires, each wire having a first and a second end, said wires being connected at said first end to a plug adapted to connect to said telephone handset and being connected at said second end to a plug adapted to connect to said computer sound card, said cable selectively providing power to said microphone and said speaker, either from said computer sound card or from a source external to said computer sound card.

* * * * *